(12) United States Patent
Dwyer

(10) Patent No.: US 6,820,251 B1
(45) Date of Patent: Nov. 16, 2004

(54) SYSTEM AND METHOD FOR A SOFTWARE RECOVERY MECHANISM

(75) Inventor: Lawrence Dwyer, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 533 days.

(21) Appl. No.: 09/706,914

(22) Filed: Nov. 6, 2000

(51) Int. Cl.[7] .............................. G06F 9/44; G06F 11/00
(52) U.S. Cl. ..................... 717/130; 717/124; 717/131; 717/132; 714/48; 714/52
(58) Field of Search ................. 717/130, 124, 717/131, 132; 714/48, 52

(56) References Cited

U.S. PATENT DOCUMENTS

| | | | | |
|---|---|---|---|---|
| 5,291,494 A | * | 3/1994 | Bruckert et al. ............... 714/24 |
| 5,293,613 A | * | 3/1994 | Hayden et al. ................ 714/15 |
| 5,487,147 A | * | 1/1996 | Brisson .......................... 714/1 |
| 5,511,164 A | * | 4/1996 | Brunmeier et al. ............ 714/53 |
| 5,513,350 A | * | 4/1996 | Griffin et al. ................ 717/106 |
| 5,581,696 A | * | 12/1996 | Kolawa et al. ................ 714/38 |
| 5,675,803 A | * | 10/1997 | Preisler et al. .............. 717/131 |
| 5,835,771 A | * | 11/1998 | Veldhuizen .................. 717/143 |
| 5,857,070 A | * | 1/1999 | Satterfield et al. ............. 714/38 |
| 5,966,541 A | * | 10/1999 | Agarwal ....................... 717/130 |
| 5,987,249 A | * | 11/1999 | Grossman et al. ........... 717/130 |
| 6,149,318 A | * | 11/2000 | Chase et al. ................. 717/131 |
| 6,173,440 B1 | * | 1/2001 | Darty ........................... 717/130 |
| 6,305,010 B2 | * | 10/2001 | Agarwal ....................... 717/133 |
| 6,332,213 B1 | * | 12/2001 | Grossman et al. ........... 717/130 |

* cited by examiner

*Primary Examiner*—Kakali Chaki
*Assistant Examiner*—Qamrun Nahar

(57) ABSTRACT

The present invention is a system and method for providing a software recovery mechanism. In architecture, the system includes a compiler that parses a source program. Error condition test logic detects if an error condition test exists in the source program, and determination logic determines if error recovery is enabled when the error condition test is detected. Error recovery flag generation logic generates an error recovery flag code when the error condition test is detected and the error recovery is enabled, and error recovery code is inserted in computer program if error recovery is enabled. The method includes the steps of parsing a source program, and detecting if an error condition test exists in the source program. If an error condition test is detected, determining if error recovery is enabled. An error recovery flag code is created when the error condition test exists and the error recovery is enabled. Error recovery code is inserted into the computer program if error recovery is enabled.

23 Claims, 10 Drawing Sheets

FIG. 2A
PRIOR ART
```
MAIN()                              31
{
    I = 0; //INITIALIZATION
    FOR (I=INIT();I<5;I++)
    {
        // CALL FUNCTION A
        A(I);
        // FURTHER PROCESSING
        I++;
    }
}
```
FIG. 2B
PRIOR ART
```
VOID A( INT X )                     32
{
    ASSERT(X > 0);
    // FURTHER
    // PROCESSING
    RETURN;
}
```
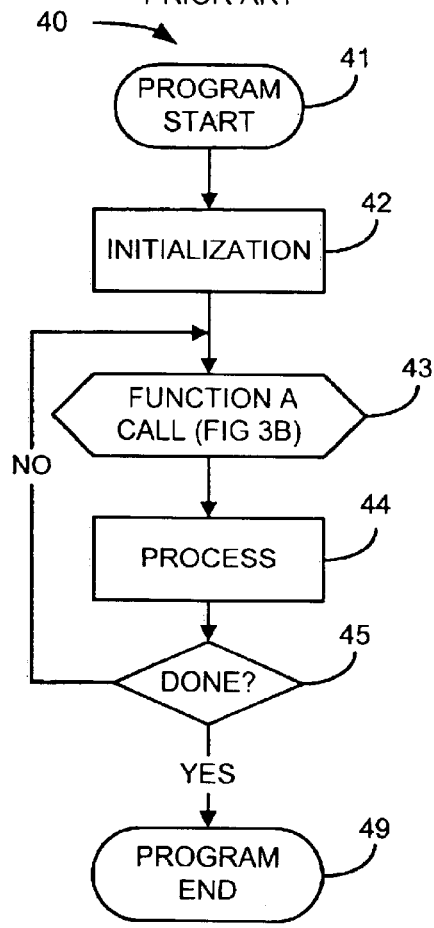
FIG. 3A
PRIOR ART
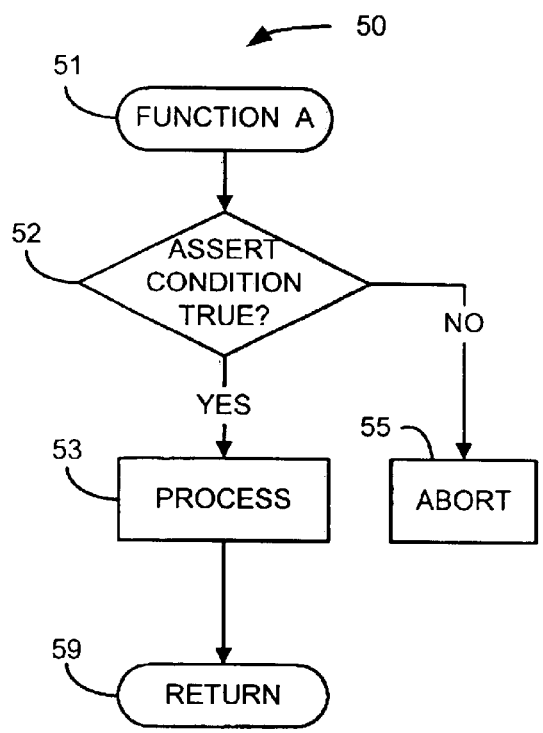
FIG. 3B
PRIOR ART

FIG. 5A

```
MAIN()                                              35
{
    I = 0; //INITIALIZATION
    FOR ( I = INIT(); I < 5; I++)
    {
        // CALL FUNCTION A
        A(I);

#PRAGMA RECOVER BEGIN                        36
            // RECOVERY CODE
            IF (I < -99)
            {
                ABORT();
            }
            IF (I <= 0)
            {
                I = 1;
            }
        #PRAGMA RECOVER END

// FURTHER PROCESSING
        I++;
    }
}
```

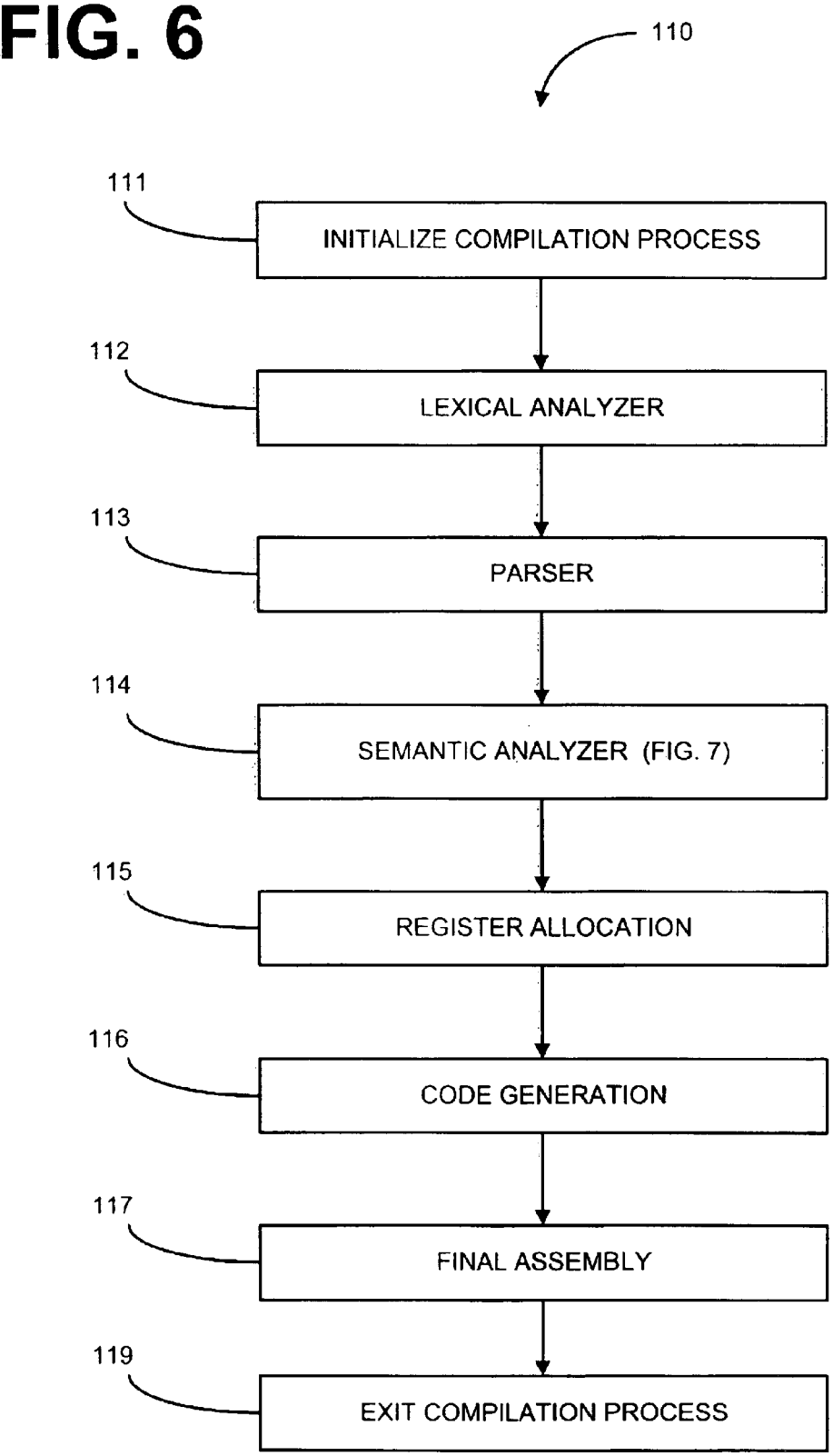

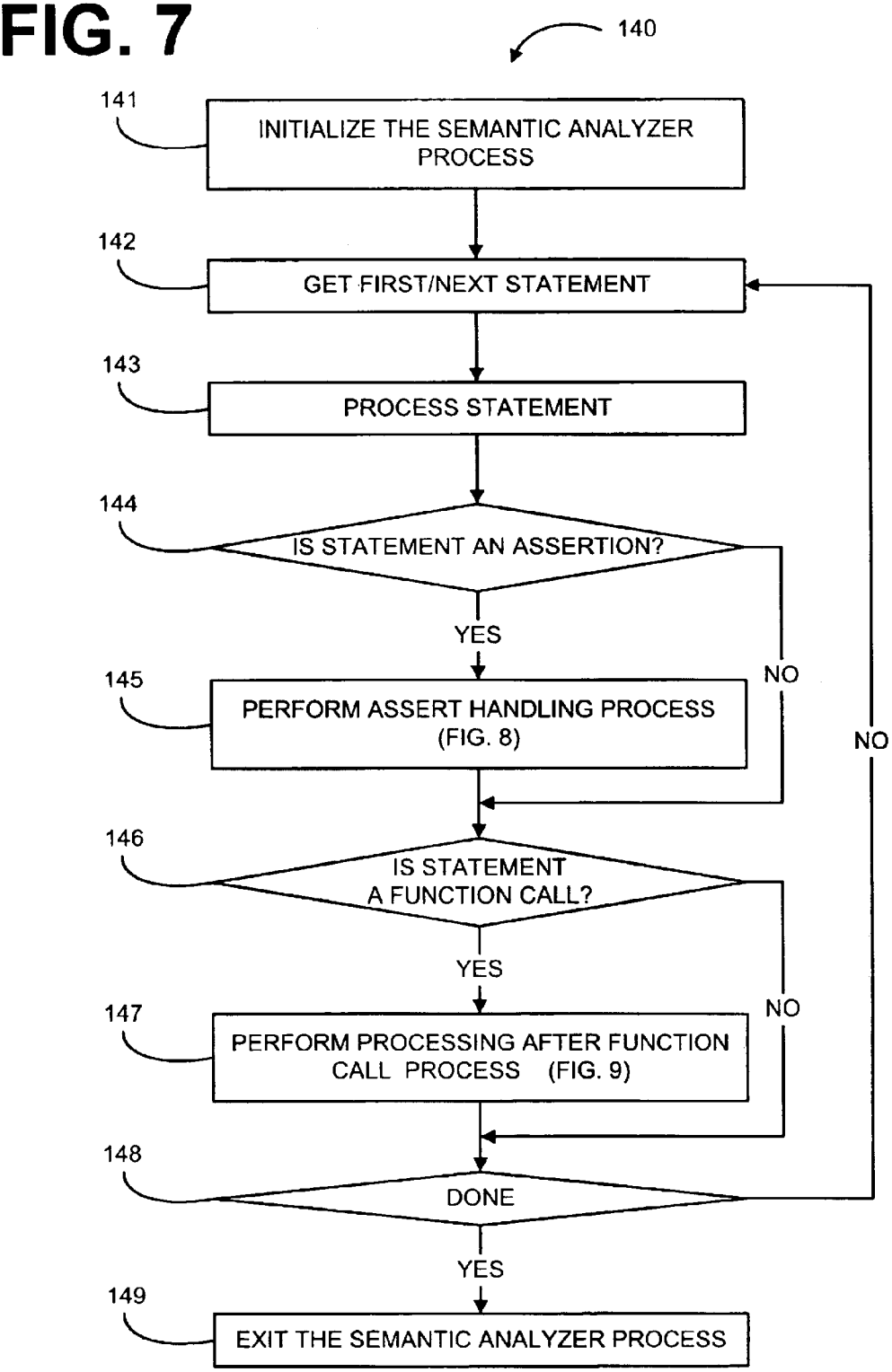

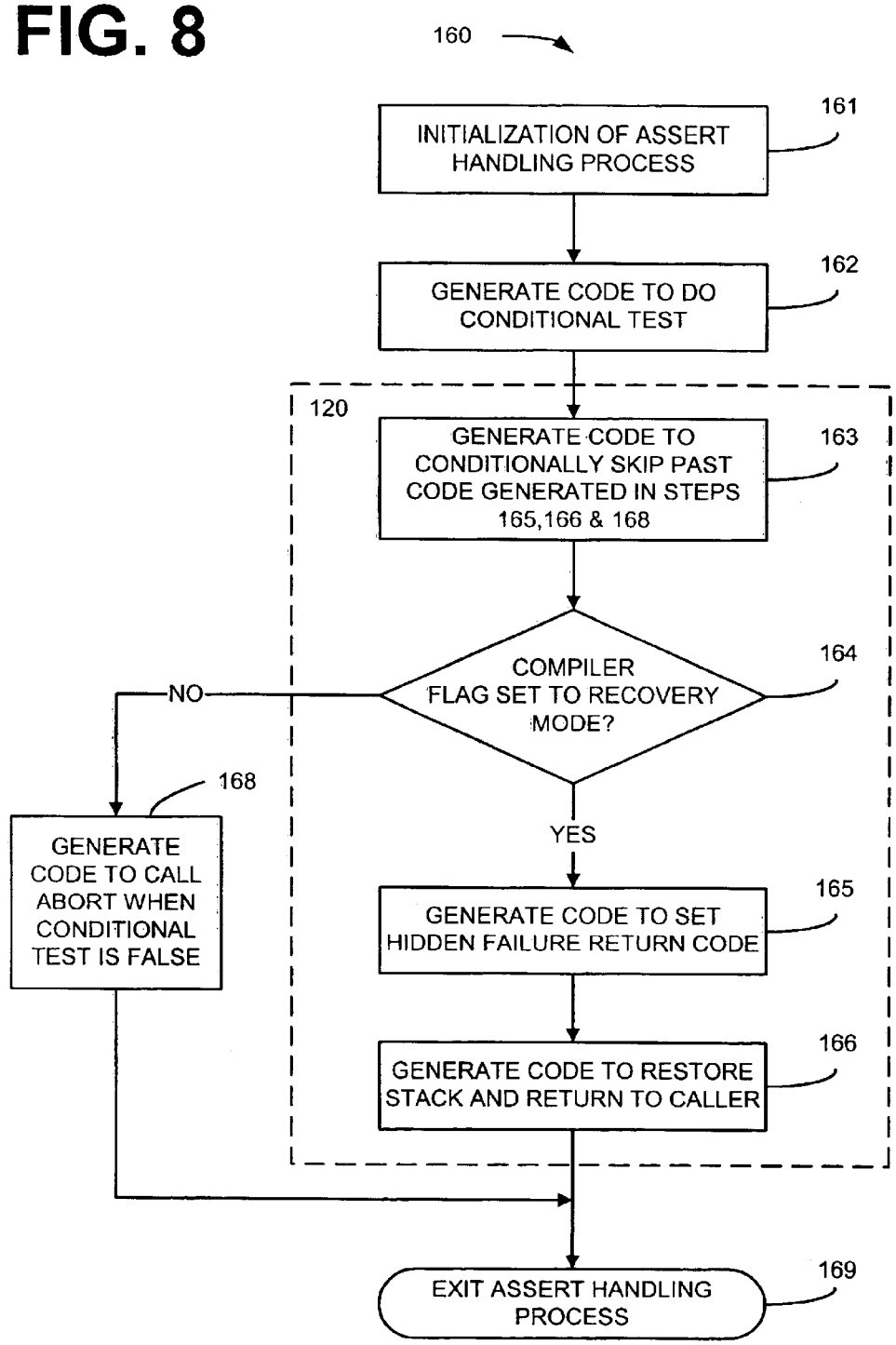

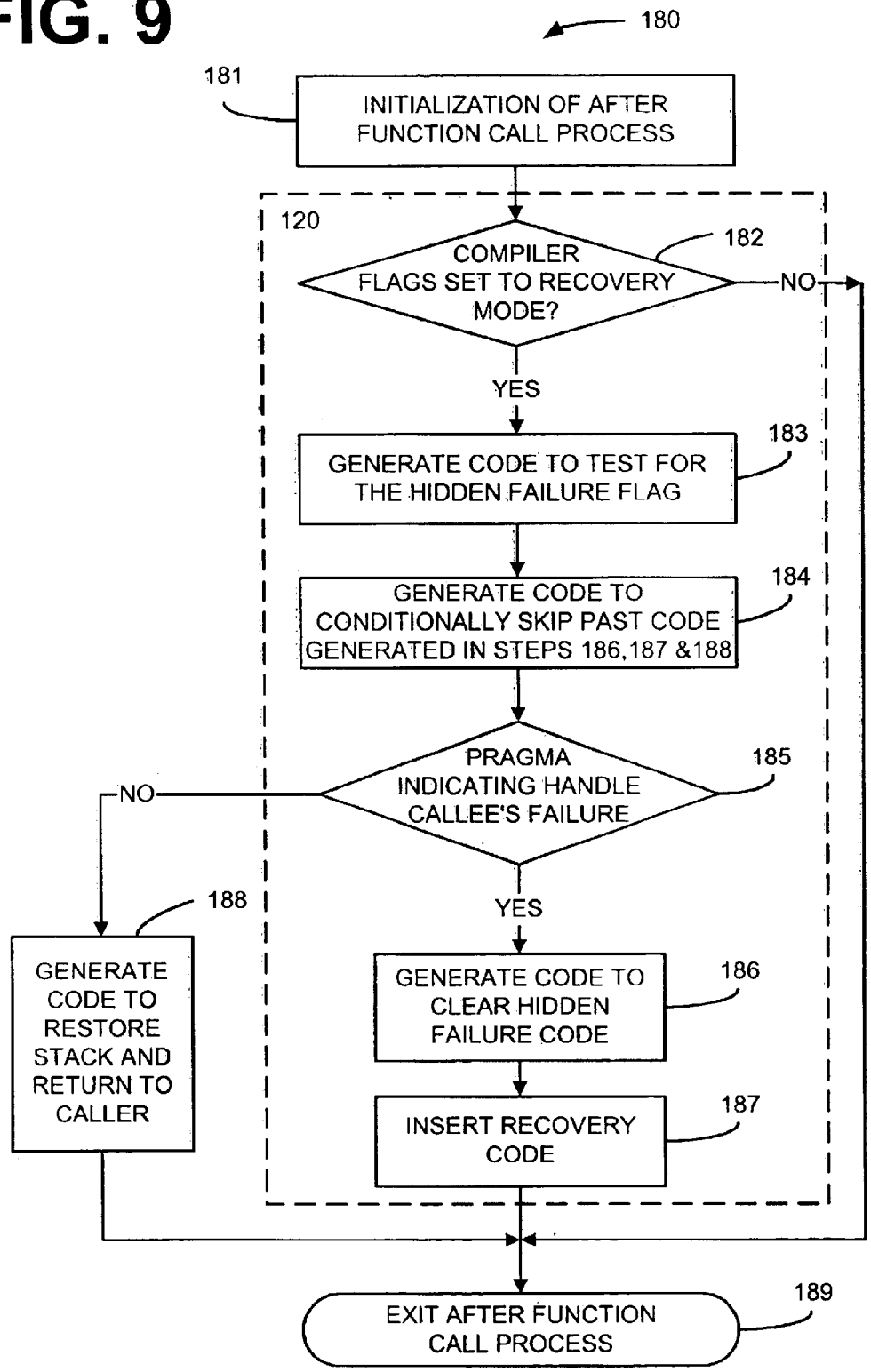

SYSTEM AND METHOD FOR A SOFTWARE RECOVERY MECHANISM

BACKGROUND OF THE INVENTION

1. Field of the Invention

The present invention is generally related to program optimization, and more particularly, to a system and method for software recovery mechanism.

2. Description of Related Art

Programming assertions are high-level programming statements that a software engineer can insert into a program to test whether a critical condition failed before executing with the rest of the program code. Failing a test initiated by a program assertion causes the program to abort. The abort is performed because the program assertion causes the branch to code that aborts the program.

When a program aborts, the program generally prints a diagnostic message, which describes the line number in the file that contains the statement that failed the program assertion test. This diagnostic message is generally printed just before the program is aborted.

Typically, programmers expect that a condition that is tested by a program assertion will never fail. Programmers assume that a defect in another portion of the program may produce the condition that causes the programming assertion test to fail. If an error is present, further processing under the failed condition may do great harm to the data, so terminating the program is better than proceeding with the failed condition that harms the data. Another assumption about programming assertions is that once a programming assertion test fails, the program cannot be corrected at the point of the programming assertion. Normally, if the condition could be corrected, the programmer would insert a test for condition followed by correction code instead of inserting a programming insertion into the program.

In general, programming assertions are placed into a program can be enabled and disabled with a single switch. Normally, the programmer enables the programming insertions during the development and testing phase of the program and then disables the programming insertions when the program is released to the consumer. When the programming assertions are disabled, the program promptly ignores any erroneous condition that may cause program errors or data corruption. The programmer disables the assertion to improve the performance of the program. When the programmer does this, the programmer is gambling that the testing with the assertions enabled uncovering of any and all defects that would cause a program assertion to fail. Heretofore, programmers have lacked a system and method for software recovery of a failed program assertion at run time.

SUMMARY OF THE INVENTION

The present invention is a system and method for providing a software recovery mechanism. Briefly described, in architecture, the system can be implemented as follows. The preferred system of the present invention utilizes a compiler that parses a source program. Error condition test logic detects if an error condition test exists in the source program, and determination logic determines if error recovery is enabled when the error condition test is detected. Error recovery flag generation logic generates an error recovery flag code when the error condition test is detected and the error recovery is enabled, and error recovery code is inserted in the computer program if error recovery is enabled.

The present invention can also be viewed as providing a method for passing compile time information between a compiler and real-time operation of post-time software. In this regard, the method can be broadly summarized by the following steps: (1) parsing a source program for an error condition test; (2) detecting if an error condition test exists in the source program; (3) determining if error recovery is enabled when the error condition test is detected; (4) creating an error recovery flag code when the error condition test exists and the error recovery is enabled; and (5) inserting error recovery code in the computer program if error recovery is enabled.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The accompanying drawings incorporated in and forming a part of the specification illustrate several aspects of the present invention, and together with the description, serve to explain the principles of the invention. In the drawings:

FIG. 2A is a block diagram of a representative example of a source program code as illustrated in FIG. 1.

FIG. 2B is a block diagram of a representative example of the source function A code illustrated in FIG. 1.

FIG. 3A is a block diagram of the program code generated from the source program code illustrated in FIG. 2A with a prior art compiler.

FIG. 3B is a block diagram of a representative example of the function code generated from the source function code illustrated in FIG. 2B generated by a prior art compiler.

FIG. 5A is a block diagram of a representative example of a source program code as illustrated in FIG. 2A, with an incorporated recovery routine utilized by the present invention.

FIG. 6 is a flow chart depicting a representative compilation process utilizing the compiler with the software recovery mechanism of the present invention as shown in FIG. 1.

FIG. 7 is a flow chart depicting a representative semantic analyzer process for the compiler with the software recovery mechanism of the present invention as illustrated in FIGS. 1 and 6.

FIG. 8 is a flow chart depicting a representative assert handling process utilized in the semantic analyzer process as illustrated in FIG. 7.

FIG. 9 is a flow chart depicting a representative processing after function call process utilized in the semantic analyzer as shown in FIG. 7.

DETAILED DESCRIPTION OF THE PREFERRED EMBODIMENT

Figure 1:
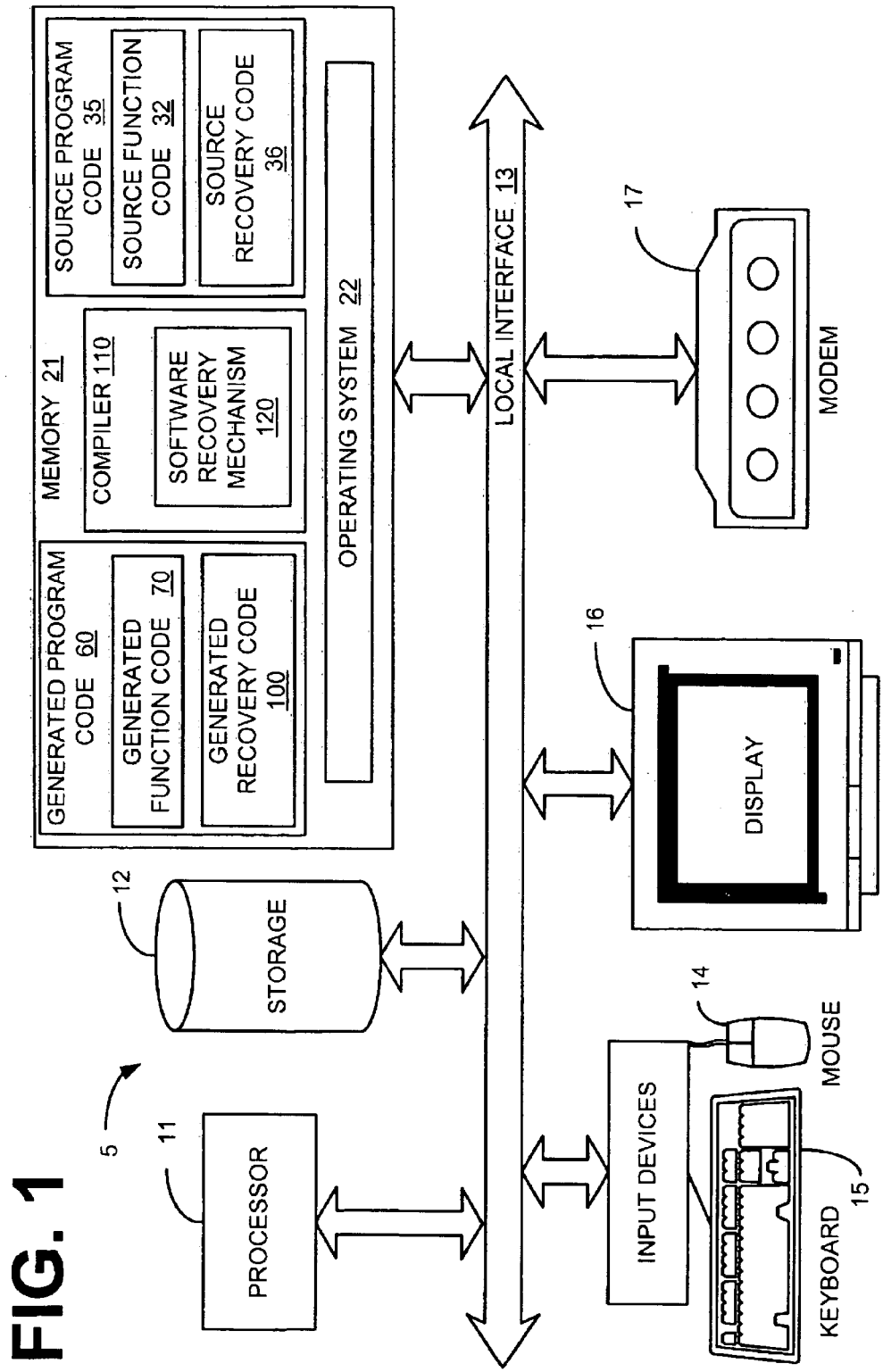
FIG. 1 is a block diagram of a user system showing the compiler with the software recovery mechanism, source recovery code, and the generated program and function code within a memory area.

Reference will now be made in detail to the description of the invention as illustrated in the drawings. While the invention will be described in connection with these drawings, there is no intent to limit it to the embodiment or embodiments disclosed therein. On the contrary, the intent is to coverall alternatives, modifications, and equivalents included within the spirit and scope of the invention as defined by the appended claims.

As illustrated in FIG. 1, computer system 5 generally comprises a processor 11 and memory 21 including an operating system 22. The memory 21 can be either one or a combination of the common types of memory such as for example, but not limited to, erasable programmable read only memory (EPROM), electronically erasable programmable read only memory (EEPROM), flash memory, programmable read only memory (PROM), random access memory (RAM), read only memory (ROM), flash memory, dynamic random access memory (DRAM), static random access memory (SRAM), system memory, or the like. Memory 21 can also be more permanent data storage such as, for example, but not limited to, compact disc read only memory (CD-ROM), disk, diskette, cartridge, cassette, ROM or the like. The operating system 22 can be a variety of different operating systems, and these heterogeneous types of operating systems include, but are not limited to, Windows®, Windows NT®, Unix®, Linex™, MVS™, OS2™, and the like.

The processor 11 accepts source program code 35 and data from the memory 21 over the local interface 13, for example, a bus(es). Direction from the user can be signaled by using input devices, for example but not limited to, a mouse 14 and a keyboard 15. The actions input and result output are displayed on the display terminal 16.

Also shown is compiler 110 with software recovery mechanism 120, source program code 35 with source function code 32, source recovery code 36, and generated program code 60 with generated function code 70, generated recovery code 100 in memory area 21. The preferred embodiment of the invention is implemented in the computer system 5. These components and their operation are herein described in further detail with regard to FIGS. 2A–9.

Illustrated in FIG. 2A is a block diagram of an example of source program code 31. The source program code is first initialized and then performs a call to function A. After performing the call to function A 23 (FIG. 2B) the source program code 31 then performs a process on the return data and then determines if processing is done. If processing is done, the source program 31 then exits.

Illustrated in FIG. 2B is a block diagram of an example of the code of the source function code 32. First, the source function code 32 checks to see if an asserted condition is true. If the asserted condition is true the source function code 32 then performs processing and then exits. If the asserted condition is false, then the source function code 32 exits through an abort sequence.

Illustrated in FIG. 3A is a block diagram illustrating the generated program code 40 for the source program code 31 shown in FIG. 2A. First, the generated program code 40 is started at step 41. Next the initialization step is performed at step 42. After performing the initialization, the generated program code 40 then calls generated function code 50 at step 43. Generated function code 50 is herein defined in further detail with regard to FIG. 3B.

After performing the function call, the generated program code 40 then performs continued processing at step 44. After further processing at step 44, the generated program code 40 then determines if it is done processing at step 45. If it is determined that the generated program code 40 is not done, the generated program code 40 then returns to repeat step 43 through 45. If it is determined at step 45 that the generated program code 40 is complete, the generated program code then exits at step 40.

Illustrated in FIG. 3B is an example of the generated function code 50. First the generated function code 50 starts at step 51. After starting, the generated function code 50 determines whether the asserted condition is true at step 52. If the asserted condition is true, the generated function code 50 then performs further processing at step 53 and exits at step 59. However, if it is determined at step 52 that the asserted condition is not true, the generated function code 50 determines that an error condition has occurred and aborts at step 55.

Figure 4A:
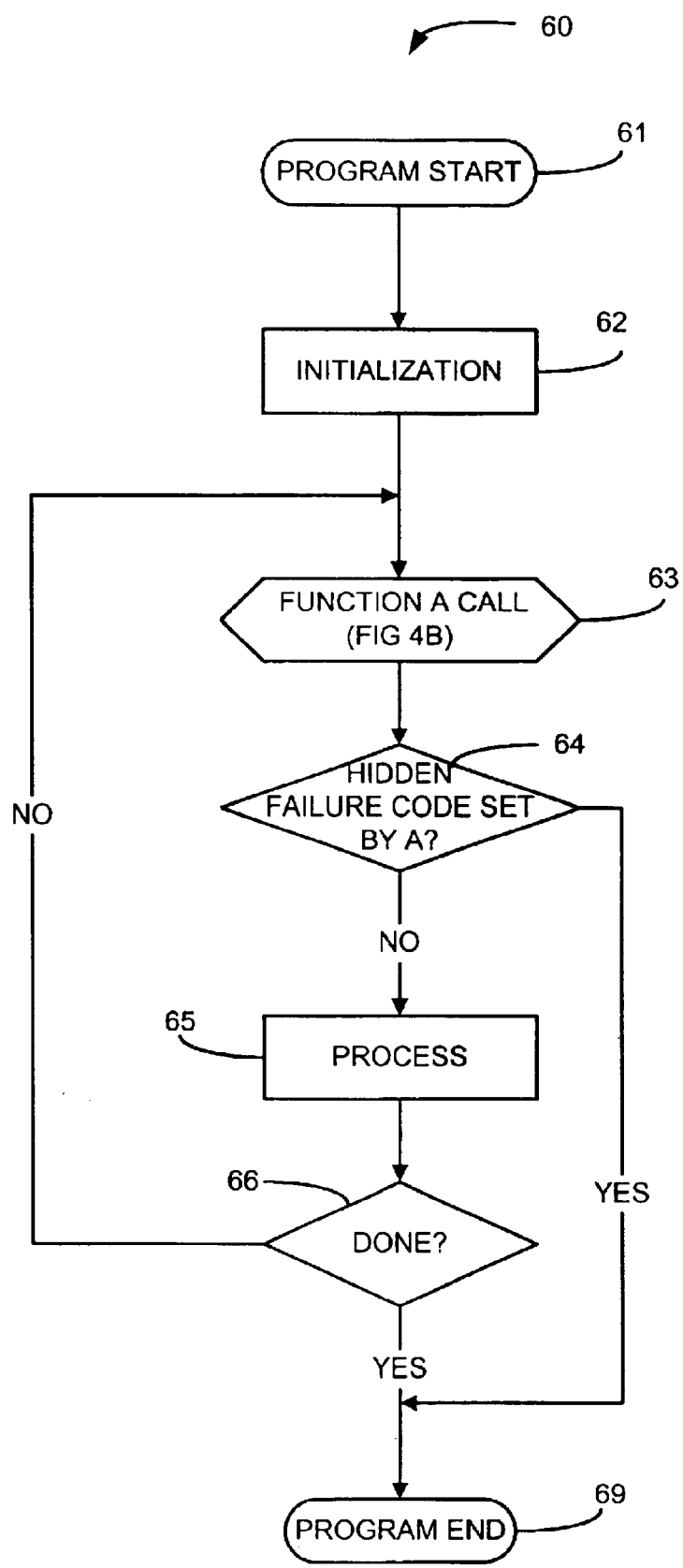
FIG. 4A is a block diagram of a representative example of generated program code from the source program code illustrated in FIG. 2A utilizing the compiler with the software recovery mechanism of the present invention.

Illustrated in FIG. 4A is an example of the generated program code 60 that is generated utilizing a compiler with the recovery software mechanism of the present invention. First the generated program code 60 is started at step 61. At step 62 the initialization of the generated program code 60 is performed. At step 63 the function A call is performed. The function A call is herein defined in further detail with regard to FIG. 4B.

Next, at step 64, the generated program code 60 determines whether a hidden failure code was set by function A. If it is determined that there was a hidden failure code set by function A, the generated program code 60 then skips to the program end and exits at step 69. However, if it is determined at step 64 that there is no hidden failure code, the generated program code 60 then performs normal processing at step 65 and determines if the execution is done at step 66. If it is determined at step 66 that the generated program code 60 is not done, the generated program code 60 then returns to repeat step 63 through step 66. However if it is determined at step 66 that the generated program code 60 is done, the generated program code then exits and ends at step 69.

Figure 4B:
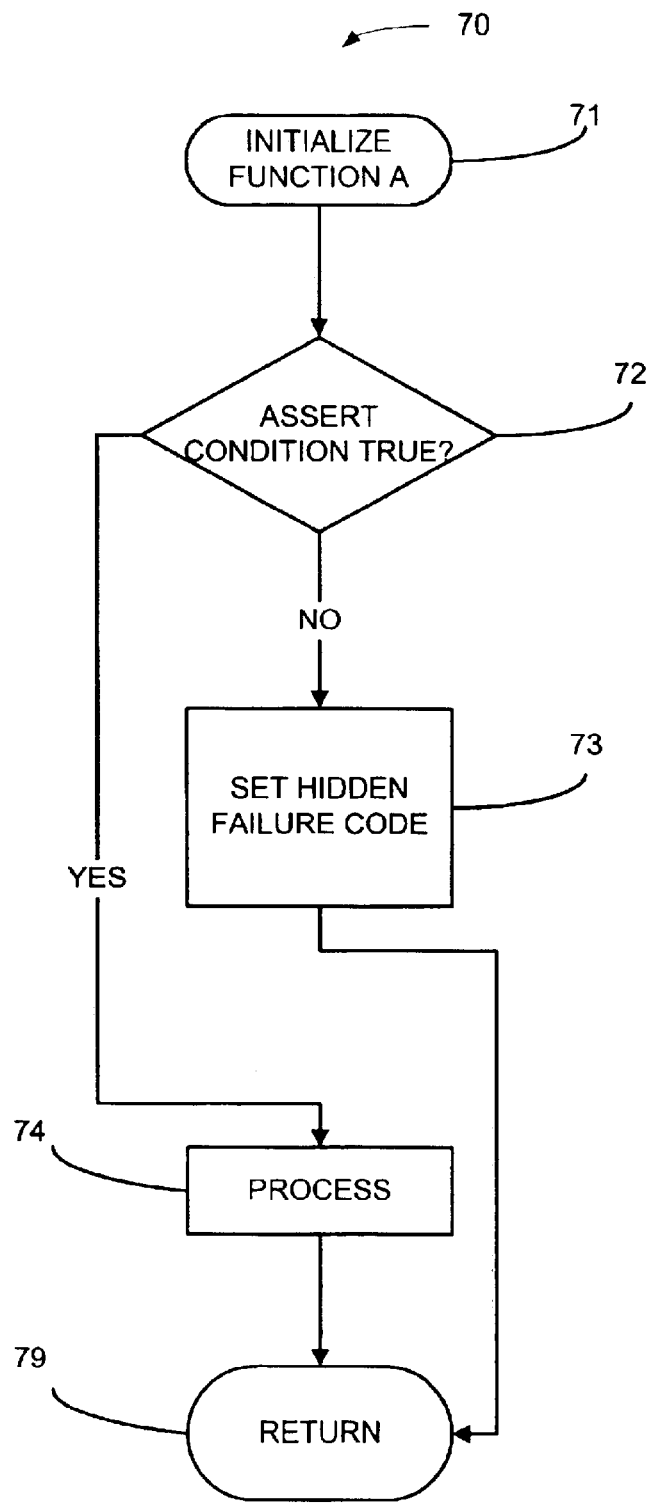
FIG. 4B is a block diagram of a representative example of the function code generated from the source function code illustrated in FIGS. 1 and 2B utilizing the compiler with the software recovery mechanism of the present invention.

Illustrated in FIG. 4B is an example of the generated function code 70 that was generated utilizing the compiler 10 with the software recovery mechanism 120 of the present invention. First, the generated function code 70 is initialized at step 71. Next, at step 72, the generated function code 70 determines whether the asserted condition is true.

If it is determined at step 72 that the asserted condition is true, the generated function code 70 then proceeds to step 74 to continue processing and exits at step 79 by returning to the calling program, which in this example is generated program code 60 (FIG. 4A). However, if it is determined at step 72 that the asserted condition is not true, the generated function code 70 then sets a hidden failure code at step 73 and returns to the calling program at step 79, which in this example is generated program code 60 (FIG. 4A).

Illustrated in FIG. 5A is a block diagram of an example source program code 35 that includes a recovery code 36. The following is a general explanation (by example) describing how the programmer uses pragma to add recovery code to a program. The programmer can put any code needed between the "recover begin" and "recover end" pragmas. This recovery code 36 will be executed if the call to function A returns with the hidden error flag set, otherwise, it is skipped.

For instance, the recovery code 36 could be written on the same line as the "#pragma recovery", but that would limit how complex a recovery sequence could be without sacrificing readability.

Alternatively, the solution could be done with "#pragma recover if," "#pragma recover else" and "#pragma recover end." This would allow the programmer to write one sequence of code that is inserted if a program is compiled with the compiler recovery mode turned on, or with another sequence of code if the compiler recover mode turned off. This allows a lot of variations as to how the programmer writes recovery code.

Shown in FIG. 5A is an example of a source program code 35. The source program code 35 is first initialized and then performs a call to function A 70 (FIG. 4B). After performing the call to function A, the source program code 35 checks if the hidden error flag is set. If the hidden error flag is set, recovery code 36 is executed. Otherwise, recovery code 36 is skipped and the source program code 35 performs a process on the return data and then determines if processing is done, the source program code 35 then exits.

Figure 5B:
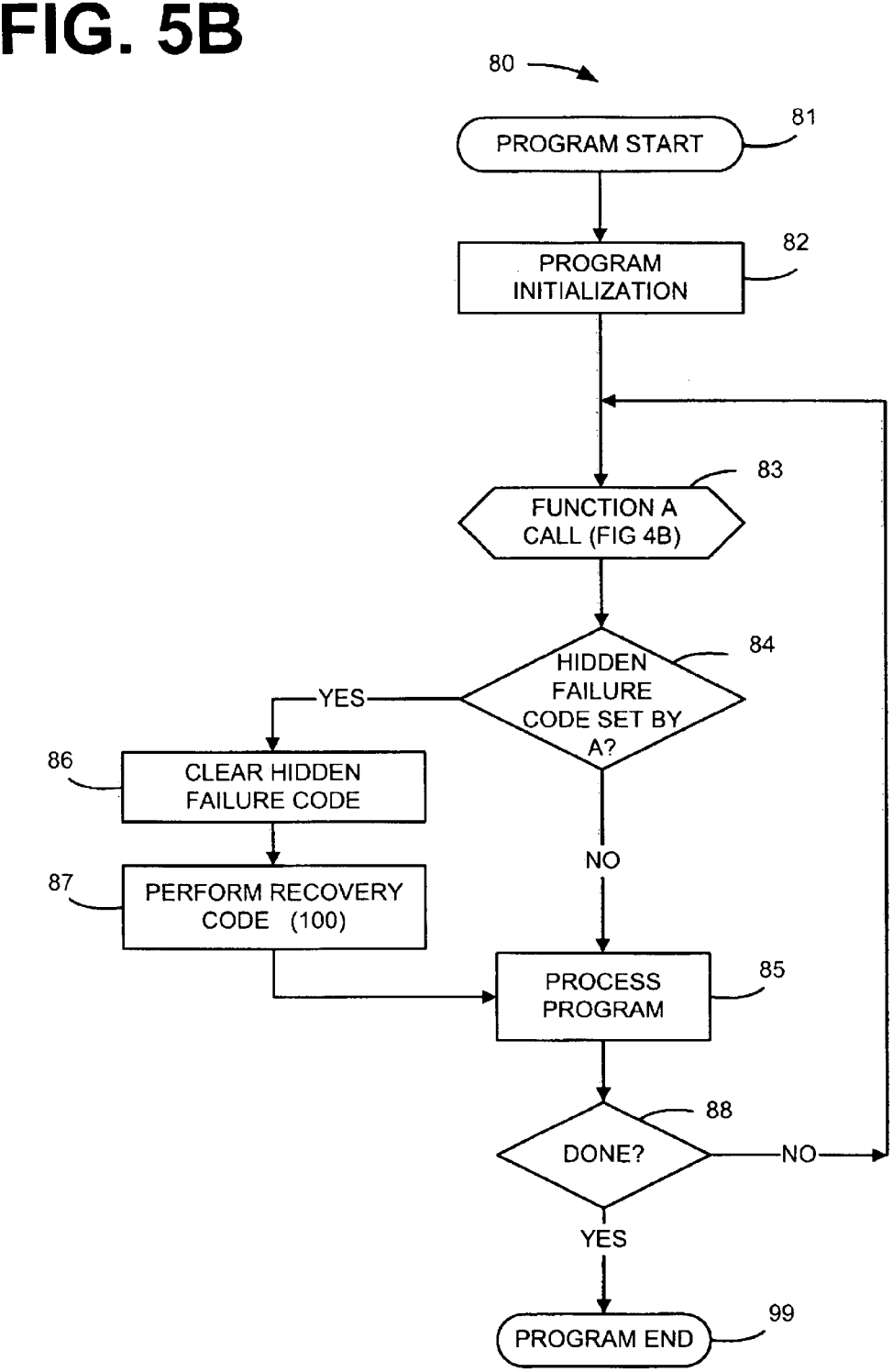
FIG. 5B is a block diagram of a representative example of the generated program code from the source program code illustrated in FIG. 5A utilizing the compiler with the software recovery mechanism of the present invention with an incorporated recovery routine.

Illustrated in FIG. 5B is an example of a representation of the generated program code 80 for the source program code 35 that includes generated recovery code 100, corresponding to recovery code 36 as shown in FIG. 5A. The generated function code illustrated in FIG. 5B is prepared by the compiler 110 with the software recovery mechanism 120 and includes generated recovery code 100 and the corresponding recovery code 36 shown in FIGS. 2 and 5A, respectively.

First, the generated program code 80 is started and performs program initialization at steps 81 and 82. At step 83, the generated program code 80 then performs a call to the generated function 70. The generated function 70 call is herein defined previously with regard to FIG. 4B. After returning from the call to the generated function 70, (FIG. 4B), the generated program code 80 then checks if a hidden failure code was set by the generated function 70 at steps 84. If it is determined that there was no hidden failure code set by the generated function 70 at step 84, the generated program code 80 then performs the remaining processing at step 85. The generated program code 80 then determines whether it is done processing at step 88, as previously defined at steps 65 and 66 (FIG. 4A).

However, if it is determined at step 84 that a hidden failure code was set by the generated function 70, the generated program code 80 then clears the hidden failure code at step 91. After clearing the hidden failure code at step 86, the generated program code 80 then performs a recovery code 100 at step 87. After performing the recovery code 100 at step 87, the generated program code 80 then proceeds to step 85 to continue processing the generated program code 80 as described above.

At step 88, the generated program code 80 determines whether there is more processing to be preformed. If it is determined at step 88 that there is more processing to be performed, the generated program code 80 returns to repeat steps 83–88. However, if it is determined at step 88 that there is no more processing to be performed, the generated program code 80 then proceeds to terminate at step 89.

In an alternative embodiment, the generated program code 80 may include code to determine whether the generated function 70 is to be recalled after an error condition has occurred. If it is determined that the generated function 70 is to be recalled, the generated program code 80 returns to repeat steps 83 and 84. However, if the generated program code 80 determines not to recall the generated function 70, the generated program code 80 then determines if it is to disable the call to generated function 70 and continue processing. If it is determined that the generated function 70 is to be disabled, the generated program code 80 proceeds to step 85 to continue processing the program. However, if, upon returning during an attempt to perform the generated function call 70 at step 83, it is determined that the generated function call 70 is disabled, the generated program code 80 skips to step 84. At step 84, a determination is made as to whether a hidden failure code was set by the call to generated function call 70. Since the call to generated function call 70 did not occur after the generated function call 70 was disabled, the generated program code 80 would then continue normal processing at step 85. However, if the call to the generated function call 70 was not to be disabled, the generated program code 80 would determine whether to terminate the program at step 88. If the generated program code 80 determined not to terminate, the generated program code 80 returns to repeat steps 83 through 88. However, if the generated program code 80 was to terminate, the generated program code 80 then proceeds to step 89 and terminates.

Illustrated in FIG. 6 is an example of a compiler 10 with software recovery mechanism 120 of the present invention. First, the compiler 110 with software recovery mechanism 120 is initialized at step 121. Next, the compiler 110 with software recovery mechanism 120 performs a lexical analyzer operation at step 122. Then, a parser is executed at step 123. The parser is a process that processes the sequence of tokens and produces an intermediate level representation, such as a parse tree or sequential intermediate code and symbol table, that records the identifiers used in the program and/or attributes. The parser may produce error messages if the token strings contain syntax errors.

The semantic analyzer operation is performed at step 124. The semantic analyzer is for checking a program for validity. This process takes the input of the intermediate code generated in the parsing step 123 and a symbol table, and determines whether the program satisfies the schematic properties of the source language, i.e., where the identifiers are consistently declared and used. The semantic analyzer step 124 may produce an error message if the program is semantically inconsistent or fails in some other way to satisfy the requirements of the programming language definitions. The semantic analyzer operation also performs the assert handling process and processing after function call processing. The semantic analyzer process is herein defined in further detail with regard to FIG. 7.

The register allocations are then performed at step 125. Then, the compiler 110 with software recovery mechanism 120 performs the code generation process at step 126. Code generation utilizes the intermediate code generated in the parser step 123 and semantic analyzer step 124 and transforms the code into equivalent machine code in the form of a relocatable object module or directly executable object code. Any detected errors may be warnings or definite errors, and in the latter case, may terminate the compilation.

Then, the compiler 110 with software recovery mechanism 120 performs the final assembly process at step 127. However, this step is optional since many compilers generate binary machine codes without requiring an assembly output. The compiler 110 with software recovery mechanism 120 is then exited at step 129.

Illustrated in FIG. 7 is a flow chart of an example of the semantic analyzer process 140 utilized in the compiler 110 with software recovery mechanism 120 (FIG. 6) of the present invention. First the semantic analyzer process 140 is initialized at step 141. At step 142 the semantic analyzer process 140 then gets the first or next code statement. At step 143, the semantic analyzer process processes that statement. At step 144, the semantic analyzer process 140 then determines whether the statement is an assertion. If the statement is an assertion, the semantic analyzer process 140 then performs the asserted handling process at step 145. The assert handling process is herein defined in further detail with regard to FIG. 8. However, if it is determined at step 24 that the current statement is not an assertion, the semantic analyzer process 140 then skips to step 146.

At step 146, the semantic analyzer process 140 then determines if the statement is a function call. If it is determined that the current statement is not a function call the semantic analyzer process 140 then skips to step 148. However, if it is determined at step 146 that the current statement is a function call, the semantic analyzer process 140 then performs the processing after function call process at step 147. After function call process is herein defined with further detail with regard to FIG. 9.

At step 148, the semantic analyzer process 140 then determines whether it is done processing. If it is determined at step 148, that the semantic analyzer is not done processing, the semantic analyzer process then returns to repeat steps 142 through step 148. However, if it is determined at step 148, that the semantic analyzer process 140 is done processing, the semantic analyzer process then exits to step 149.

Illustrated in FIG. 8 is the flow chart of an example of the assert handling process 160 for the semantic analyzer process 140 (FIG. 7), utilized in the compiler 1110 with software recovery mechanism 120 (FIG. 6) of the present invention. First, the assert handling process 160 is initialized at step 161. Next, at step 162, the assert handling process 160 generates code to do conditional test.

At step 163, the assert handling process 160 generate code to conditionally skip past code generated in steps 165–168. Next, at step 164, the assert handling process 160 determines whether the compiler flag is set to recovery mode. If it is determined at step 164 that the compiler flag is set to recovery mode, the assert handling process 160 then generates code to set the hidden failure return code at step 165. At step 166, the assert handling process then generates code to restore the stack and return the processing to the caller of the current segmented code. The software recovery mechanism 120 includes the functionality in step 163–166. The assert handling process 160 then exits at step 169.

However, if it is determined at step 164 that the compiler flag is not set to recovery mode, the assert handling process 160 then proceeds to step 168 to generate code to call an abort when an assert condition is false. The assert handling process 160 then exits at step 169.

Illustrated in FIG. 9 is a flow chart of an example of the after function call process 180 utilized by the semantic analyzer process 140 (FIG. 7). First, the after function call process 180 is initialized at step 181. At step 182, it is determined whether the compiler flag is set to recovery mode. If it is determined that the compiler flag is not set to recovery mode, the after function call process 180 then skips to step 189 and exits.

If it is determined at step 182 that the compiler flag is set to recovery mode, the after function call process 180 generates code to test for the hidden failure flag at step 183. At step 184, the after function call process 180 generate code to conditionally skip past code generated in steps 186–188. Next, at step 185, the after function call process 180 determines if there is pragma indicating the handle callee's failure. If it is determined at step 185 that the pragma indicating the callee's failure is present; the after function call process 180 then generates the code to clear the hidden failure code at step 186 and inserts a recovery code at step 187. The software recovery mechanism 120 includes the functionality in step 182–187. After inserting the recovery code at step 187 the after function call process 180 then exits at step 189.

However, if it is determined that the pragma indicating the callee's failure is not present, the after function call process 180 then proceeds to step 188 and generates the code to restore the stack and return the current code segment being generated to the caller. After performing step 188, the after function call process 180 then proceeds to step 189 and exits.

A compiler with a software recovery mechanism 120 comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device.

The computer readable medium can be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

The foregoing description has been presented for purposes of illustration and description. It is not intended to be exhaustive or to limit the invention to the precise forms disclosed. Modifications or variations are possible in light of the above teachings. The flow charts of the present invention show the architecture, functionality, and operation of a possible implementation of the register usage optimization compilation and translation system. In this regard, each block represents a module, segment, or portion of code, which comprises one or more executable instructions for implementing the specified logical function(s). It should also be noted that in some alternative implementations, the functions noted in the blocks may occur out of the order noted in the figures, or for example, may in fact be executed substantially concurrently or in the reverse order, depending upon the functionality involved.

The embodiment or embodiments discussed were chosen and described to provide the best illustration of the principles of the invention and its practical application to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method of providing recovery from an error condition during initialization of a generated program code, comprising the steps of:

calling a generated function code;

testing an assertion in the generated function code, such that when the assertion is false, the generated function code performs the steps of:

generating a hidden failure code;

returning to the generated program code; and returning the hidden failure code to the generated program code;

and such that when the assertion is true, the generated function code performs the steps of:

continuing processing of the generated function code; and returning to the generated program code when the processing of the generated function code is completed; and inserting an error recovery code into the generated program code when error recovery is enabled and when the hidden failure code is returned, the step of inserting performed by the generated program code.

2. The method of claim 1, further comprising the step of resetting the hidden failure code, the step of resetting performed in conjunction with the step of inserting the error recovery code into the generated program code.

3. The method of claim 1, wherein the step of generating the hidden failure code further comprises generating a hidden failure flag by the generated function code.

4. The method of claim 1, wherein the step of inserting the error recovery code further comprises determining if error recovery is enabled, the step of determining performed by the generated program code after the step of returning the hidden failure code.

5. The method of claim 4, wherein the step of determining if error recovery is enabled further comprises the step of aborting when error recovery is disabled.

6. The method of claim 4, wherein the step of determining if error recovery is enabled further comprises the step of exiting the generated program code when error recovery is disabled.

7. The method of claim 1, further comprising the step of aborting when error recovery is disabled, the step of aborting performed by the generated program code.

8. The method of claim 1, wherein the step of testing the assertion in the generated function code further comprises the step of immediately returning to the generated program code when the assertion is false.

9. The method of claim 1, further comprising the step of compiling a computer program, wherein the steps of calling, testing, generating and inserting are performed during compiling.

10. The method of claim 1, further comprising the steps of:

detecting if a call to a subroutine exists in the generated program code; and creating an error recovery flag test code to test if error recovery is enabled and to test if the subroutine exists.

11. The method of claim 1, further comprising the step of generating code to conditionally skip a program abort code and an error recovery flag code when the hidden failure code exists and error recovery is not enabled.

12. The method of claim 1, wherein the step of inserting an error recovery code into the generated program code further comprises the step of inserting code between a #pragma recover if statement and a #pragma recover end statement.

13. The method of claim 1, wherein the step of inserting the error recovery code into the generated program code further comprises the step of inserting code between a #pragma recover else statement and a #pragma recover end statement.

14. The method of claim 1, further comprising the step of continuing processing of the generated program code, the step of continuing performed after the step of inserting the error recovery code into the generated program code.

15. A system for providing recovery from an error condition in a computer program, said error recovery system comprising:

means for calling a generated function code by calling a generated program code;

means for testing an assertion in the generated function code, such that when the assertion is false, the generated function code generates a hidden failure code, returns to the generated program code, and returns the hidden failure code to the generated program code; and such that when the assertion is true, the generated function code continues processing of the generated function code and returns to the generated program code when the processing of the generated function code is completed;

means for resetting the hidden failure code in conjunction with inserting an error recovery code into the generated program code; and means for inserting the error recovery code into the generated program code when error recovery is enabled and when the hidden failure code is returned.

16. The system of claim 15, wherein the means for generating the hidden failure code further comprises means for generating a hidden failure flag.

17. The system of claim 15, wherein the means for inserting the error recovery code further comprises means for determining if error recovery is enabled, means for inserting operable after the means for testing has returned to the generated program code.

18. The system of claim 17, wherein the means for determining if error recovery is enabled further comprises means for aborting when error recovery is disabled.

19. The system of claim 17, wherein the means for determining if error recovery is enabled further comprises means for exiting the generated program code when error recovery is disabled.

20. The system of claim 15, further comprising means for aborting when error recovery is disabled, the means for aborting performed by the generated program code.

21. The system of claim 15, wherein the means for testing the assertion in the generated function code further comprises means for immediately returning to the generated program code when the assertion is false.

22. The system of claim 15, further comprising:

means for detecting if a call to a subroutine exists in the generated program code; and means for creating an error recovery flag test code to test if error recovery is enabled and to test if the subroutine exists.

23. A computer-readable medium for providing recovery from an error condition in a generated program code, comprising:

logic that calls a generated function code;

logic that tests an assertion in the generated function code, such that when the assertion is false, the generated function code generates a hidden failure flag, returns to the generated program code, and returns the hidden failure flag to the generated program code; and such that when the assertion is true, the generated function code continues processing of the generated function code and returns to the generated program code when the processing of the generated function code is completed;

logic that resets the hidden failure flag in conjunction with inserting an error recovery code into the generated program code; and logic that inserts the error recovery code into the generated program code when error recovery is enabled and when the hidden failure flag is returned.

* * * * *